Dec. 12, 1944.  A. CORTE  2,364,951
GUN TURRET MOUNTING
Filed Nov. 22, 1940   2 Sheets-Sheet 1
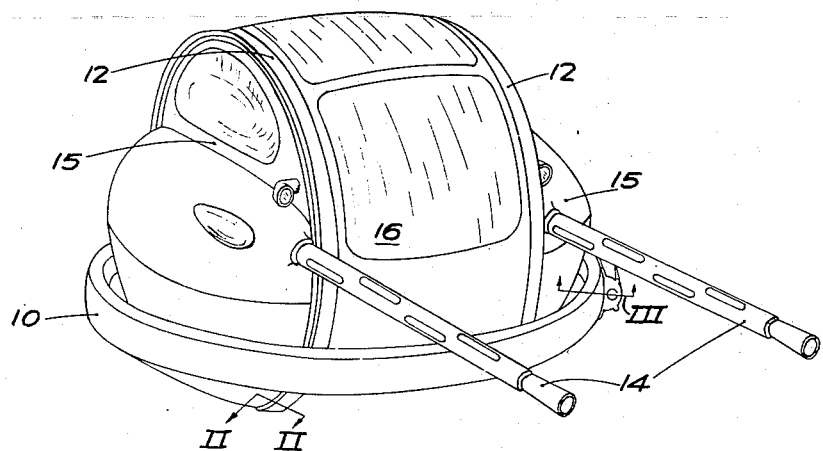
FIG-I
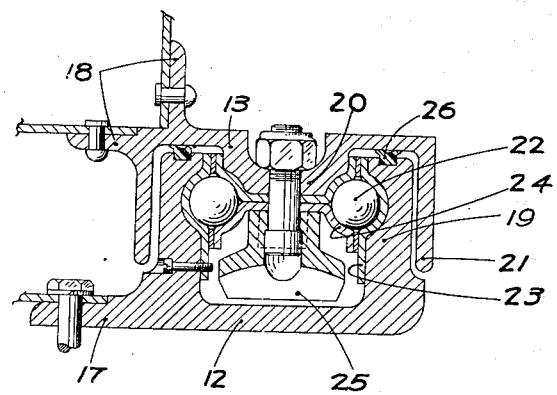
FIG-II
INVENTOR
Alfred Corte Dec. 12, 1944. A. CORTE 2,364,951
GUN TURRET MOUNTING
Filed Nov. 22, 1940 2 Sheets-Sheet 2
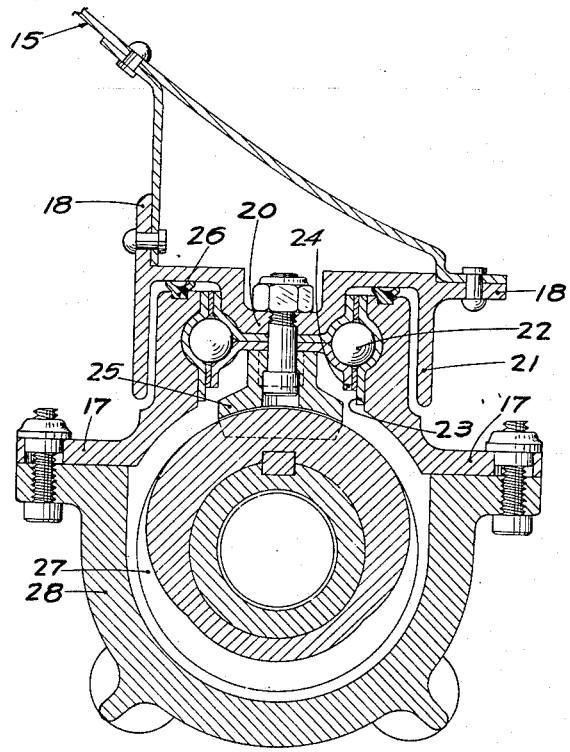
FIG-IV
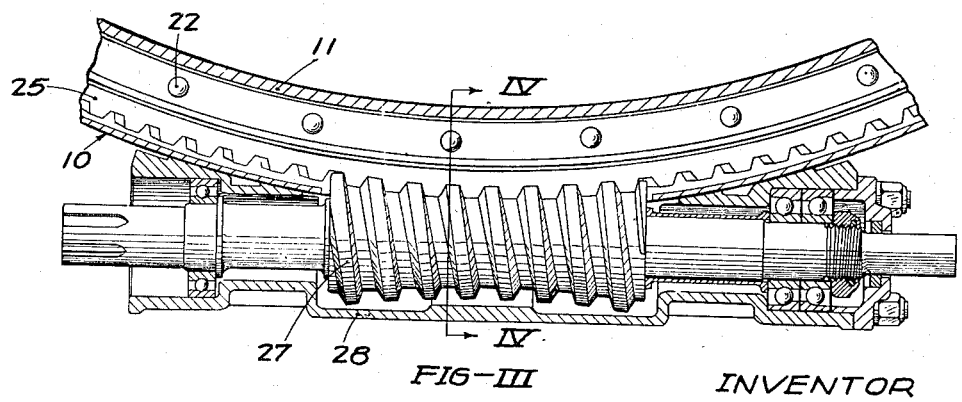
FIG-III
INVENTOR
Alfred Corte Patented Dec. 12, 1944

2,364,951

UNITED STATES PATENT OFFICE 2,364,951

GUN TURRET MOUNTING

Alfred Corte, Glendale, Calif., assignor, by mesne assignments, to Lockheed Aircraft Corporation, a corporation of California Application November 22, 1940, Serial No. 366,659

6 Claims. (Cl. 74—425)

This invention relates to an improved gun turret and has particular reference to the mounting arrangements providing for separate traversing and elevating movements of parts of the turret, the combination of movements permitting aiming of the gun or guns over the entire field or zone of fire.

A gun turret of this general type has been disclosed in more detail in my previous application entitled "Gun turret" Serial No. 362,067, filed October 21, 1940, and the present application is directed to the mounting or track which permits traversing and elevating the turret and guns.

In a power driven gun turret, the problem of applying the driving torque to the turret structure is complicated by the need for a rigid connection between the drive and the turret so that there will be no overshoot of the turret movement upon reversal of the torque, such as would arise from torsional elasticity in the coupling between the drive and the structure. If the rotatable turret members were supported at their axes in the conventional type of journal, the attainment of the necessary torsional rigidity would involve the use of excessively large and heavy coupling members. In addition, such a method of support would necessarily result in an inefficient use of the space available for the turret.

According to my invention the movable elements of the turret rotate in large diameter, ball-bearing tracks. These tracks form the support for the turret elements, and hence constitute a system of centerless ball bearing races. The traverse and elevation movements of the turret are effected by the use of worm-gear drives. In each case, the driving worm is mounted upon the outer race, while the gear is attached to the inner race. As is usual in worm drives, there is a force tending to separate the gears which represents a component of the driving torque appearing by virtue of slippage along the pressure angle of the gear. This separating force may be of quite considerable magnitude, and in the conventional type of worm drive is taken care of by the housing which supports both the gear shaft journals and the worm shaft journals. In the centerless arrangement as used herein, no such housing exists and the track itself must be designed in such a manner that this force is taken care of. In the conventional type of ball bearing race, such a separating force would be transmitted by the inner race or by the shaft on which the inner race is pressed, to the diametrically opposite side of the race, and appear there as a compressive force between the races. However, the large diameter of the ball races and the absence of any shaft or similar support for the inner race precludes the possibility of using this system, since the deflections from circular form experienced by the races would be of such magnitude as to affect the performance of the worm-gear drive. In fact, none of the conventional types of ball-bearing arrangements were found capable of accommodating such a load directly at the point of application, so it was necessary to develop an entirely new type specifically for application to the turret. It is, accordingly, an object of this invention to provide an improved turret mounting or track that in effect supports either component of a two part turret from its periphery for rotation in traverse and elevation.

It is another object of this invention to provide an improved turret mounting of the type described wherein substantially identical horizontal and vertical pivots may be combined into a structure wherein one mounting is offset from a major diameter of the other mounting to permit the use of interfitting large diameter mountings with non-intersecting axes, to support the armament in a position to obtain the maximum range of field of fire.

It is another object of this invention to provide an improved turret mounting track or bearing capable of resisting both radial and thrust loads at the point of application rather than to rely on the stiffness of the races to transmit loads to the compression side of the bearing.

It is another object of this invention to provide an improved turret mount or track wherein continuous fixed and movable components thereof are held in predetermined relationship by ball-bearings, sealing means being provided between the fixed and movable components to retain lubricant and exclude foreign matter.

It is also an object of this invention to provide track and race members for mounting a turret the sections for which can conveniently be formed by rolling or extrusion, complete with mounting flanges that can be cut away locally where not required for attachment to parts of the turret.

Other and further important objects of this invention will be apparent from the disclosures in the specification and the accompanying drawings.

This invention in its preferred form is illustrated in the drawings and hereinafter more fully described.

Figure I is a perspective view of a gun turret embodying horizontally and vertically movable components supported in tracks or bearings embodying the features of this invention.

Figure II is an enlarged cross-section of one vertically disposed track on the line II—II of Figure I.

Figure III is a central longitudinal section of the horizontal track taken through the driving worm location.

Figure IV is a cross-section on the line IV—IV of Figure III.

The aircraft turret chosen for illustrative purposes includes a horizontal track having a stationary outer ring or base 10 which can conveniently be mounted in a well or opening in the fuselage of an airplane. The base 10 embraces the periphery of the turret, which is carried by a member 11 forming the movable inner race of a centerless ball bearing, the outer stationary race of which is formed by the ring or base 10. The movable part of the horizontal bearing supports the vertical outer rings 12 of a pair of ball bearings substantially identical to that already mentioned, which bearings are spaced apart to provide room for the gunner, and have side closures 15 in their movable members 13 which side closures support twin machine guns 14 for elevation in unison. The space between the outer rings 12 is enclosed by transparent panels 16. The turret thus comprises a pair of side closures 15 which tilt about a horizontal axis in the bearing rings 12, while the entire turret rotates about a vertical axis in the bearing ring 10.

The horizontal and vertical bearings are substantially identical in construction, being formed from basic shapes with various types of mounting flanges which can be removed at localities where they are not needed. For example, the horizontal outer ring 10 is provided with mounting flanges 17 as indicated in the section of Figure IV, while the right hand flange has been removed in Figure II, which is a section of the vertical bearing. Similarly, the inner members 11 and 13 are formed from a common or basic cross-section by the removal of one or more flanges 18. Thus the actual bearing portions of the horizontal and vertical bearings are identical in cross-section, so that reference numerals common to the two will be used in what follows. The stationary outer rings 10 and 12 are provided with an inwardly opening channel formed by spaced ears 19, between which is positioned a central tongue 20 carried by the inner members 11 and 13. The bearing members may be conveniently formed as rolled or extruded sections of light alloy, with suitable flanges 21 which provide the rigidity necessary for their use as structural members of the turret. The high unit pressures of the individual balls 22 which would ordinarily cause Brinnelling of the alloy are taken by hardened steel inserts 23 and 24. The rolled or extruded alloy sections are rolled to the circular form as used in the track and butt welded or otherwise fastened, while the steel inserts 23 for the outer tracks are stamped in sections and assembled on the races. These insert sections are several thousandths of an inch short of the required arc, to accommodate for the differential thermal expansion of the alloy and the steel. The inserts 24 of the inner track are rolled of steel in two or more sections, and bolted to the inner race.

The driving ring gear 25 is also made in segments which are bolted to the inner member, facing the outer ring. In the case of the horizontal bearing the gear segments 25 extend entirely around the circumference of the inner ring; but for the vertical bearings they need only cover the usable range of elevation of the guns which in the case of a top turret extends from somewhat below the horizon to the azimuth. The gear is completely enclosed by the two races except at the worm location so that it is protected from mechanical damage. The protection is made complete by the use of rubberlike seals 26 which run around the complete inner circumference of the ears 19 in contact with the inner race 13 insuring against the entrance of dirt or the loss of lubricant. These seals serve also as pressure seals for the turret and are so designed that any difference in pressure between the inside and the outside of the turret serves to force the seals even harder against the metal surface so that there is no chance of dirt being blown in or of lubricant being forced out. A driving worm 27 is of the cone type, and runs in a housing 28 which is bolted to the outer track. The worm 27 may conveniently be arranged for a power drive at one end, and for an emergency hand drive at the other end. The worm threads project through an opening in the outer track to engage with the gear on the inner track, as shown in Figures III and IV. Complete enclosure of the worm by the housing, and efficient sealing of the track elements results in a driving unit which can be easily lubricated and which is completely protected against the entrance of dirt and moisture.

The design of the track is such that each circumferential element of the bearing is capable of taking loads in any direction normal to the periphery independently of the rest of the bearing. A force which in the case of the horizontal track represents the normal gravitational load, is taken by the lower of the two sets of ball bearings acting as a normal thrust bearing. The opposite force, which may appear in the course of the plane maneuvers, is taken in the same way by the upper set of bearings. The force arising from lateral acceleration of the turret such as would occur during a turn, is transmitted diagonally through each of the two sets of balls working together, while the opposite force, which may be due either to a lateral acceleration of the turret or to the separating force of the gears, is transmitted by the outer element of the inner race lining diagonally through the two sets of balls to the outer race. Thus, all possible loads are taken by the balls at the point of application, and any displacement of the tracks will only be such as could occur by compression of the balls, which, of course, will be quite small.

It will thus be seen that I have invented an improved turret mounting for the purpose described, and I desire to emphasize the fact that many modifications may be resorted to in a manner limited only by a just interpretation of the following claims.

I claim:

1. A peripheral bearing mounting for traversible and elevatable portions of a gun turret, comprising a relatively stationary outer ring having an inwardly opening channel forming spaced ears, ball bearing races attached to the facing surfaces of said ears, an inner member having flanges enveloping the outer surfaces of said spaced ears and a central tongue, projecting into the space between said ears, two part double ball races attached to said tongue in opposition to the races carried by said ears, series of balls engaged between the first and second named races, said first and second named races conforming to the balls so as to transmit radial and torque loads to balls in all directions, a gear ring also secured to said tongue, and a driving worm carried by said outer ring and projecting through an aperture therein to engage said gear whereby to rotate the inner member relative to the outer ring.

2. A peripheral bearing mounting for traversible and elevatable portions of a gun turret, comprising a relatively stationary outer ring having an inwardly opening channel forming spaced ears, ball bearing races attached to the facing surfaces of said ears, an inner member having flanges enveloping the outer surfaces of said spaced ears and a tongue projecting into the space between said ears, two part double ball races attached to said tongue in opposition to the races carried by said ears, series of balls engaged between the first and second named races, the races conforming to the balls so as to transmit radial and torque loads to balls in all directions, rubber-like seals engaging between said ears and the inner member to seal the bearing against air pressure as well as foreign matter, a gear ring secured to said tongue, and a driving worm carried by said outer ring and projecting through an aperture therein to engage said gear whereby to rotate the inner member relative to the outer ring.

3. A centerless or self-supporting ball bearing for mounting gun turret components about their periphery, comprising stationary and movable annular ring-like members one of which has a projection extending in spaced relationship into a channel in the other member, ball races mounted in opposed relationship on either side of said projection and in said channel, a series of balls disposed in the races on each side of said projection, a worm gear mounted on said projection between said ball races, and a worm mounted in the channel of the other ring-like member and so constructed and arranged as to be in driving engagement with said worm gear, said races and balls assuming the force tending to separate said gear and worm at the zone of application of said force.

4. A bearing of the character described comprising a ring having an annular channel and spaced annular ears defining the side walls of the channel, an annular member arranged in substantially concentric relation to the ring to oppose the mouth of said channel, the member and ring being related for relative rotation, a tongue on the member extending into said channel and spaced from its said side walls, ball races on said side walls of the channel, ball race means on the tongue, said race means being divided into two ring-like sections each having two spaced race parts arranged to oppose the first named ball races, means for securing said ring-like sections to the tongue, and a series of balls at each side of the tongue received in and conforming to said first named ball races and said race parts for the transmission of radial and thrust loads in all directions between the ring and member.

5. A bearing of the character described comprising two relatively rotatable ring-like members, one having an annular channel, the other having a tongue extending into the channel to be in spaced relation to the side walls thereof, ball races on the side walls of the channel, a ring-like element in the channel beyond the inner end face of the tongue, a pair of race sections held between said element and said end face of the tongue, each section having race parts which oppose the ball races on the side walls of the channel, said race parts of the two sections being in adjacent relation and being complementary to constitute ball races which oppose the first named races, and a series of balls at each side of the tongue received in and cooperating with said first named races and the last named races for the transmission of radial and thrust loads in all directions between the members.

6. A bearing of the character described comprising a stationary ring-like member and a rotatable ring-like member, the two members being in concentric relation, a reduced annular tongue on one member received in a channel in the other member, the sides of the tongue being spaced from the side walls of the channel, ball races on the side walls of the channel, an annular element beyond the inner end face of the tongue, superimposed race sections secured between the end face of the tongue and said element, each section having spaced race parts opposing the races on the side walls of the channel, the race parts of one section bearing against the opposite sides of the tongue, the race parts of the other section bearing against the opposite sides of said element, the said race parts of the two sections being complementary to form ball races which oppose the first named races, and a series of balls at each side of the tongue disposed in the first and second named races for the transmission of radial and thrust loads between the members in all directions.

ALFRED CORTE.